2,825,405

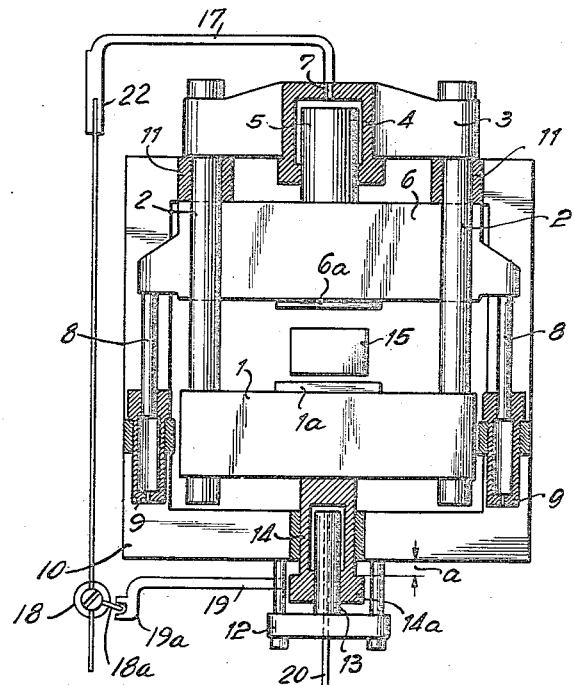

HYDRAULICALLY OPERATED INGOT-SHEARING MACHINES

Franz Maass, Dusseldorf - Gerresheim, and August Sturtzer, Dusseldorf, Germany, assignors to Schloemann Aktiengesellschaft, Dusseldorf, Germany Application January 27, 1955, Serial No. 484,472

Claims priority, application Germany February 19, 1954

3 Claims. (Cl. 164—56)

With a known mechanically working ingot-shearing machine the work can be done in such a way that the lower blade first lifts the ingot a little way, for instance 10 millimetres, off the roller track, then the upper blade is set upon the ingot, and finally the lower blade executes the cut from below. Such a construction of the shears saves the roller track from injury, keeping it free from all direct stresses during the cutting.

The object of the present invention is to provide a hydraulically driven shearing machine of the simplest possible construction in such a way that for it the same method of working is possible as for the mechanical shearing machine described above.

For this purpose the invention starts from a hydraulically actuated ingot-shearing machine, the upper and lower blades of which, movable in vertical guides, execute the cut under the action of pistons and cylinders arranged between them, the upper blade being clampable in a position that can be predetermined.

The invention consists in the feature that the lower blade can be raised, independently of the position of the upper blade, preferably by a constant amount, for instance 10 millimetres.

The control of such a press may be so arranged that the control movement that releases the cutting movement is blocked so long as the lower blade is not raised. The first working stroke of the shears must then consist each time in raising the lower blade about 10 millimetres, so that no cutting movements are possible so long as the ingot is resting upon the roller track. The correct working of such a shearing machine is independent of the attention of the operator, which cannot be dispensed with in the case of the known hydraulic shears; for with the latter the work is done in such a way that the upper blade is lowered to a position about 10 millimetres above the upper edge of the ingot and is then clamped, whereupon the cutting is effected with the lower blade. Since the correct adjustment of the upper blade also depends upon the thickness of the ingot to be cut it cannot be effected automatically in a simple manner, but must in every case be effected by the operator, whereby an element of uncertainty is introduced into the operation.

Constructionally the problem of raising the lower blade is best solved, according to a further feature of this invention, by providing, for the raising of the lower blade, a separate hydraulic unit consisting of piston and cylinder. If an adjustable throttle valve is interposed in the outflow pipe thereof, it can serve as a buffer during the descent of the movable parts of the shears, in order to obviate a hard impact.

One form of construction of the shearing machine according to the invention is illustrated by way of example in the accompanying drawings, in which:

Figure 1 shows a general view of the machine; and

Figure 2 is a diagrammatic side view of the two shear blades, with adjacent roller tracks.

The lower blade-holder 1 of the shearing machine is suspended from two tension rods 2, the upper ends of which are attached to a cross-bar 3. To the cross-bar 3 is secured a hydraulic cylinder 4, in which there moves a plunger 5 which is fixedly connected with the upper blade-holder 6. Upon the admission of liquid under pressure into an inlet port 7 of the cylinder 4, therefore, the upper blade-holder 6 and the lower blade-holder 1 are brought nearer together. To the upper blade-holder 6 are attached plungers 8, the pressure cylinders 9 of which are supported in a stationary frame 10. Lateral portions of the frame 10 form guides for the upper blade-holder 6 and for the lower blade-holder 1, and the upper portion of the frame carries distance pieces 11, which limit the upward movement of the upper blade-holder 6 and the downward movement of the cross-bar 3, and which also form guides for the tension rods 2. To the lower part of the frame 10 is secured, by way of a cross-bar 12, a stationary plunger 13, which extends into a cylinder 14, which bears firmly against the underside of the lower blade-holder 1 in the initial position of the latter. For the admission of liquid under pressure into the inlet port 7 of the cylinder 4 a pipe 17 is provided, the admission being controlled by a valve 18. To a stop 14a on the cylinder 14 is secured a forked rod 19, which engages a projection 18a on the valve 18 in such a way as to open the valve when the cylinder 14 has ascended about 10 millimeters. A sliding joint 22 is provided in the pipe 17 to allow for the up and down movements of the cylinder 4. The bladeholders 1 and 6 cannot be brought nearer together for the cutting stroke until the valve 18 is opened.

Finally by 15 is denoted the ingot, which is to be cut by means of the upper blade 6a mounted on the holder 6 and the lower blade 1a mounted on the holder 1. Figure 2 shows the ingot 15 to be cut, resting on roller tracks 16, with the shear blades 1a and 6a still open.

When cutting is to be effected with the shears, the ingot 15 that has been introduced is raised through about 10 millimetres into the position 15a shown in dot-and-dash lines in Figure 2, by ascent of the lower blade 1a. This is effected by supplying pressure liquid to the cylinder 14. The dimension a of the lift may be limited by the stop 14a on the cylinder 14, so that the stroke a can never be greater than 10 millimetres. After the raising of the ingot 15, the upper blade is lowered until it touches the ingot, after which cylinder 9 is closed so that no further descent of the upper blade is possible. Liquid under pressure is then admitted to cylinder 4 and the cutting is effected from below with the lower bladeholder 1 being lifted away from the cylinder 14 by the upward movement of cross-bar 3 and the tension rods 2.

The plungers 8 serve for retracting the upper bladeholder 6 and for holding the upper blade-holder 6 fast in its upper position. After the cutting the cylinder 14 serves as a buffer for the descending lower blade-holder 1. In order to fix the extent of the cushioning, an adjustable throttle valve 21 may be interposed in the discharge pipe 20 from the cylinder 14.

We claim:

1. A hydraulically actuated ingot-shearing machine, comprising: a stationary frame, an upper blade-holder, an upper blade secured in the upper blade-holder, hydraulic cylinder and plunger means interposed between the frame and the upper blade holder for raising the upper blade-holder and controlling its descent before the shearing stroke and for holding the upper blade-holder stationary during the cutting stroke, a lower blade-holder, a lower blade secured in the lower blade-holder, at least one hydraulic cylinder and plunger means interposed between the stationary frame and the lower blade-holder, at least one of said last-mentioned cylinder and plunger means being movable for initially raising the lower bladeholder a short distance from its lowest position, an abutment means operably associated with the movable one of said last-mentioned cylinder and plunger means for limiting the extent to which the lower blade-holder is raised to about ten millimeters, vertical tension rods secured to the lower blade-holder and extending upwards therefrom, a cross-bar secured to the upper ends of the said rods, and at least one hydraulic cylinder and plunger means interposed between the cross-bar and the upper blade-holder for forcing the cross-bar upwards and thereby forcing the lower blade-holder up towards the upper blade-holder for the shearing stroke.

2. A hydraulically actuated ingot-shearing machine as claimed in claim 1, further comprising means controlled by the initial raising of the lower blade-holder by the hydraulic cylinder and plunger means interposed between the lower blade-holder and the stationary frame, for controlling the admission of liquid to the cylinder of the cylinder and plunger means interposed between the cross-bar and the upper blade-holder.

3. A hydraulically actuated ingot-shearing machine as claimed in claim 1, further comprising an outflow pipe from the cylinder interposed between the stationary frame and the lower blade-holder, and an adjustable throttle valve interposed in this outflow pipe.

References Cited in the file of this patent

UNITED STATES PATENTS 830,276    Aiken _____ Sept. 4, 1906